United States Patent
Rimkus et al.

(10) Patent No.: US 7,216,532 B2
(45) Date of Patent: May 15, 2007

(54) SYSTEM AND METHOD FOR WARM TIRE FILL PRESSURE ADJUSTMENT

(75) Inventors: Robert A Rimkus, Macomb, MI (US); J. David Rosa, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 92 days.

(21) Appl. No.: 11/109,269

(22) Filed: Apr. 19, 2005

(65) Prior Publication Data

US 2006/0235652 A1 Oct. 19, 2006

(51) Int. Cl.
*E01C 23/00* (2006.01)
(52) U.S. Cl. .................................................... 73/146
(58) Field of Classification Search .............. 73/146, 73/708, 146.2, 146.3, 146.4, 146.5, 700; 340/442
See application file for complete search history.

(56) References Cited

U.S. PATENT DOCUMENTS

| | | | |
|---|---|---|---|
| 6,658,928 B1 * | 12/2003 | Pollack et al. | 73/146 |
| 6,711,955 B1 * | 3/2004 | Wilkerson, Jr. | 73/708 |
| 6,722,193 B1 * | 4/2004 | Conway | 73/146.8 |

* cited by examiner

*Primary Examiner*—Jewel Thompson
(74) *Attorney, Agent, or Firm*—Timothy J. Marsh

(57) ABSTRACT

A method is provided for recommending proper tire pressure using a tire pressure recommendation system having a processor. The method comprises obtaining a cold placard tire pressure ($P_{Pl}$) for a cold placard air temperature ($T_{Pl}$) and obtaining a measured outside air temperature ($T_{Outside}$). The cold placard tire pressure ($P_{Pl}$), the cold placard air temperature ($T_{Pl}$) and the measured outside air temperature ($T_{Outside}$) are entered into the tire pressure recommendation system. The recommended tire pressure ($P_{Re}$) is then calculated with the processor for the measured outside air temperature ($T_{Outside}$), the recommended tire pressure ($P_{Re}$) being based upon the cold placard tire pressure ($P_{Pl}$).

16 Claims, 1 Drawing Sheet

SYSTEM AND METHOD FOR WARM TIRE FILL PRESSURE ADJUSTMENT

TECHNICAL FIELD

The present invention generally relates to tire pressure monitoring, and more particularly relates to a technique for providing a recommended tire pressure.

BACKGROUND

Properly inflated tires are an important part of tire care. Properly inflated tires run cooler and more efficiently, which improves handling, extends tread life and tire life, and increases gas mileage. Vehicle and tire manufacturers typically provide information for proper air pressure for each vehicle tire. The pressures are known as placard pressures, and may be included in the vehicles owner's manual, and may also be on a sticker positioned on the vehicle. Placard pressures are usually given for "cold" tire conditions, such as 30 psi at 30° C. In addition, many times instruction is given to add 3 or 4 psi to the placard pressure if the tire is "warm".

Many drivers do not know if the tire is cold or warm, and do not know what the proper pressure should be. Accordingly, it is desirable to provide a way to calculate a corrected tire pressure and provide a more accurate recommended tire pressure to the driver. In addition, it is desirable to provide feedback when proper tire inflation pressure is reached. Furthermore, other desirable features and characteristics of the present invention will become apparent from the subsequent detailed description and the appended claims, taken in conjunction with the accompanying drawings and the foregoing technical field and background.

BRIEF SUMMARY

A method is provided for recommending proper tire pressure using a tire pressure recommendation system having a processor. The method comprises obtaining a cold placard tire pressure ($P_{Pl}$) for a cold placard air temperature ($T_{Pl}$) and obtaining a measured outside air temperature ($T_{Outside}$). The cold placard tire pressure ($P_{Pl}$), the cold placard air temperature ($T_{Pl}$) and the measured outside air temperature ($T_{Outside}$) are entered into the tire pressure recommendation system. The recommended tire pressure ($P_{Re}$) is then calculated with the processor for the measured outside air temperature ($T_{Outside}$), the recommended tire pressure ($P_{Re}$) being based upon the cold placard tire pressure ($P_{Pl}$).

A method is provided for recommending proper tire pressure using a tire pressure recommendation system having a processor. The method comprises obtaining a cold placard tire pressure ($P_{Pl}$) for a cold placard air temperature ($T_{Pl}$) and obtaining a measured current tire temperature ($T_{Tire}$). The cold placard tire pressure ($P_{Pl}$), the cold placard air temperature ($T_{Pl}$) and the measured current tire temperature ($T_{Tire}$) are then entered into the tire pressure recommendation system. The recommended tire pressure ($P_{Re}$) is then calculated with the processor for the current tire temperature ($T_{Tire}$), the recommended tire pressure ($P_{Re}$) being based upon the cold placard tire pressure ($P_{Pl}$).

An apparatus is provided for a tire pressure recommendation system. The apparatus includes a memory element for storing data indicative of a cold placard tire pressure for a cold placard air temperature and a thermometer capable of measuring air temperature near the tire. The system further provides processing logic configured to generate a recommended tire pressure for the measured outside air temperature, the recommended tire pressure being based upon the cold placard tire pressure. This system also provides a display for communicating the recommended tire pressure.

BRIEF DESCRIPTION OF THE DRAWINGS

The present invention will hereinafter be described in conjunction with the following drawing figures, wherein like numerals denote like elements.

DETAILED DESCRIPTION

Figure 1:
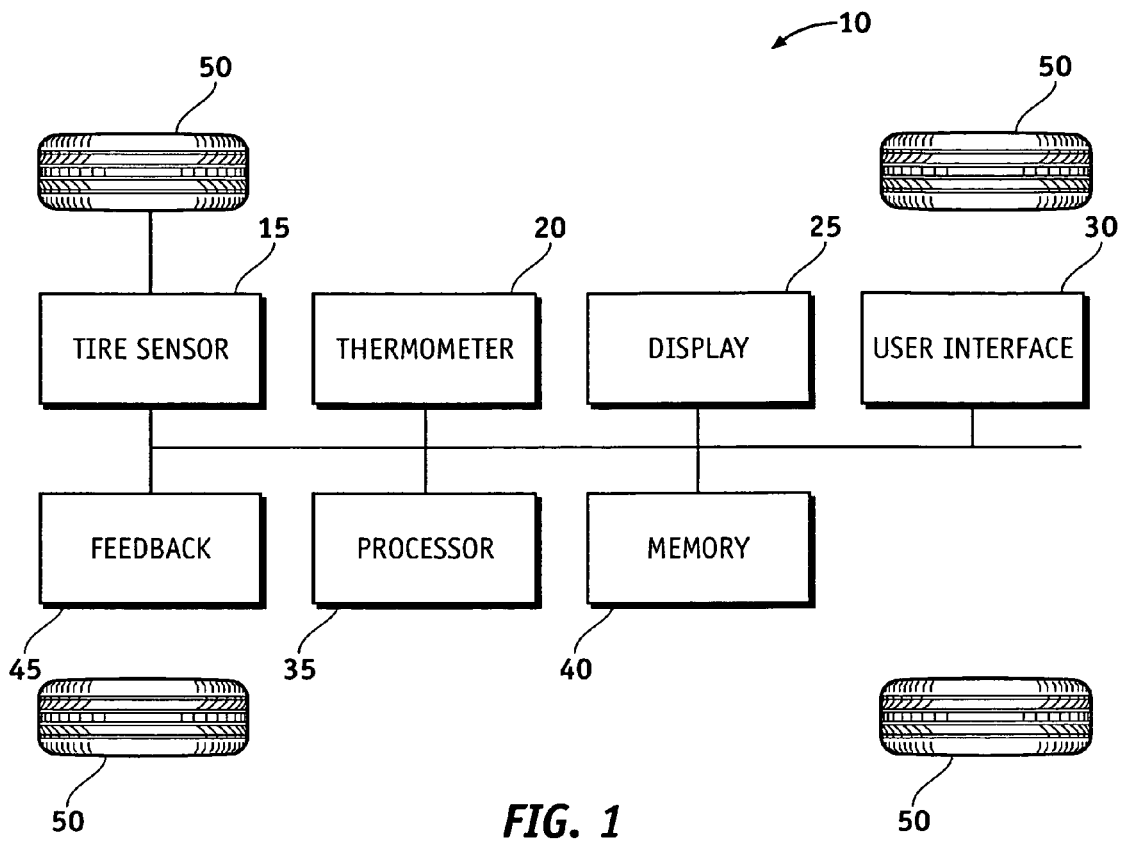
FIG. 1 is a schematic representation of an example tire pressure system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described in terms of functional and/or logical block components and various processing steps. It should be appreciated that such block components may be realized by any number of hardware, software, and/or firmware components configured to perform the specific functions. For example, an embodiment of the invention utilizes equations with input from sensors, such as tire pressure, tire temperature and outside air temperature. To accomplish this, the invention may employ integrated circuits, e.g., memory elements, digital signal processing elements, logic elements, look-up tables, or the like, which may carry out a variety of functions under the control of one or more microprocessors or other control device. In addition, those skilled in the art will appreciate that the present invention may be practiced in conjunction with any number of vehicle systems and that the particular implementation described herein is merely one exemplary application of the invention.

For the sake of brevity, conventional techniques related to tire sensors, temperature sensors, data processing, data transmission from the sensors to the processor, and other functional aspects of the system (and individual operating components of the systems) may not be described in detail herein. Further, connecting lines shown in various figures contained herein are intended to represent example functional relationships and/or physical couplings between various elements. It should be noted that many alternative or additional functional relationships or physical connections may be present in a practical embodiment.

The present invention provides a method and system for adjusting tire pressure by calculating a recommended tire pressure for different temperatures without having to park the vehicle for one hour to allow the tire to reach "cold" temperature. The system may be fully or partially automated, leveraging an onboard vehicle computing architecture, network, or platform. The system may also process data or information obtained manually by a user. In one embodiment, the system is programmed with the recommended "cold" tire pressure and, sometimes known as placard tire pressure. The "cold" pressure is the pressure that the tire should be at after the vehicle has sat for at least one hour at the current ambient outside temperature. Therefore, the cold placard temperature is the outside temperature at which the tire has sat at least one hour (which changes frequently based on weather). Using the programmed data, along with available measured current temperature data, such as outside air temperature or tire temperature, a corrected or recommended tire pressure may be calculated at the current temperature. This corrected or recommended tire pressure can be communicated to the customer using a vehicle display and/or vehicle feedback, in the form of a light flash or horn chirp. The tire pressure communication and/or feedback can indicate to the customer when a tire has been filled to recommended pressure.

FIG. 1 is a schematic representation of an example tire pressure recommendation system 10 that may include one or more of the following components: a tire sensor 15, a thermometer 20, a display 25, a user interface 30, a processor 35, a memory 40 and a feedback element 45. The system 10 may be a stand alone system or may be part of the vehicle systems (not shown). The tire sensor 15 is positioned inside of the tire(s) 50 and is capable of measuring tire pressure and tire temperature inside the tire(s) 50 using known techniques. The thermometer 20 may be used to measure the current air temperature using known techniques. The thermometer 20 may be part of a vehicle sensor capable of measuring outside ambient temperature. The display 25 may be used to convey information to the driver concerning the tires and their condition. In this regard, the display 25 may be incorporated into the vehicle display cluster. The user interface 30 may be used to input information into the system 10, such as the cold placard tire temperature and the cold placard tire pressure. The processor 35 may be used to control the components of the system 10 and perform calculations to determine the recommended tire pressure. In practice, processor 35 can be any general purpose microprocessor configured to process application program instructions in support of the system 10. The memory 40 may be used to store tire information for use in the tire pressure calculations. The feedback element 45 may be used to indicate when a tire has been filled to recommended pressure, for example with a light flash or horn chirp.

Figure 2:
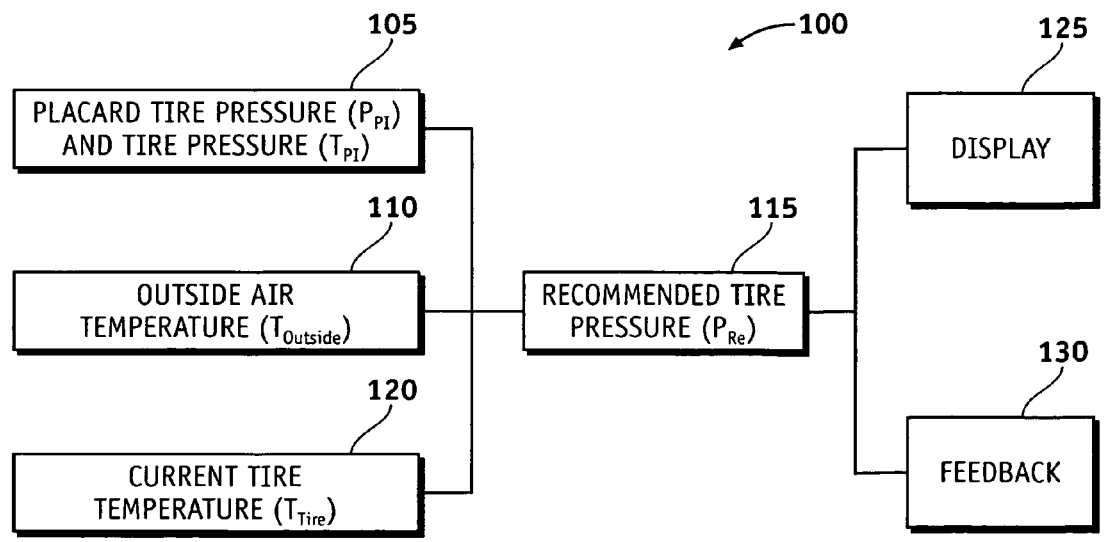
FIG. 2 is a flow chart of an example tire pressure system diagnostic process according to the invention.

FIG. 2 shows a flow chart of a tire pressure recommendation process 100. Cold placard tire pressure ($P_{Pl}$) and cold placard air temperature ($T_{Pl}$) is provided at step 105. The cold placard tire pressure ($P_{Pl}$) is the pressure that the tire is after the vehicle has sat for at least an hour at the cold placard air temperature ($T_{Pl}$). The cold placard tire pressure ($P_{Pl}$) may be may be taken via the tire sensor 15 and cold placard air temperature ($T_{Pl}$) may be may be taken via the thermometer 20, or they may be entered via the user interface 30. Measured current outside air temperature $T_{Outside}$ is obtained by known techniques at step 110. The outside air temperature $T_{Outside}$ may be taken automatically via thermometer 20 or by hand and entered via the user interface 30. With this information, the recommended tire pressure ($P_{Re}$) may be calculated by processor 35 at step 115, such as with equations 1 or 2 discussed below. In another embodiment, measured current tire temperature ($T_{Tire}$) is taken at step 120 and the recommended tire pressure ($P_{Re}$) may be calculated at step 115, such as with equations 3, 4, 5 or 6 discussed below. The recommended tire pressure $P_{Re}$ may then be communicated via a display 25 at step 125. Vehicle feedback is provided at step 130 with a feedback element to indicate when a tire has been filled to recommended pressure. The process 100 may continuously monitor pressure while a user fills the tire at a gas station, for example, to provide an accurate fill.

The following examples are used to illustrate these scenarios.

The equations for recommending tire pressure can take two primary forms. The first is based on an industry rule-of-thumb regarding temperature and tire pressure, and the second uses the ideal gas law.

Rule-Of-Thumb Equation—The rule of thumb is that tire pressure changes 1 psi for every 5.56° C. (or ~10° F.) change in temperature. Starting with a known tire pressure and temperature, a recommended tire pressure can be given for different temperatures. For example, if the starting tire pressure and temperature are those listed on the placard, the recommended tire pressure for a measured outside air temperature using this rule is:

$$P_{Re} = P_{Pl} + \left[\frac{T_{OutAir} - T_{Pl}}{5.56° \text{ C./psi}}\right] \quad \text{Equation 1}$$

Where:
$P_{Re}$=Recommended tire pressure (psi)
$P_{Pl}$=Cold placard tire pressure (psi)
$T_{OutAir}$=Outside air temperature (C)
$T_{Pl}$=Cold Placard air temperature (C)

EXAMPLE 1

Using the Rule-Of-Thumb Equation 1 in which tire pressure is measured in pounds per square inch (psi) and temperature is in degrees Centigrade (C) or Kelvin (K). As the outside air temperature changes, so does the recommended tire pressure. In this example, the following information is used:
$T_{Pl}$=0° C. (or 300° K)
$P_{Pl}$=30 psi
$T_{Outside}$=27° C. (or 273° K)
Using equation 1 with the conditions given above, the recommended tire pressure ($P_{Re}$) is:

$$P_{Re} = 30 \text{ psi} + \left[\frac{27° \text{ C.} - 0° \text{ C.}}{5.56° \text{ C./psi}}\right] = 34.86 \text{ psi}$$

Ideal Gas Law Equation—The ideal gas law states that pressure (P), volume (V) and temperature (T) are related via the equation PV=nRT, where:
P=pressure;
T=temperature;
V=volume;
n=the number of moles of gas present; and
R=the universal gas constant.
Predicated on this law, changes in measurable tire pressure can be affected by any of these variables. R and n are constant. In addition, tire volume is assumed to be constant ($V_1=V_2$). Therefore, in the case of a tire, pressure P and temperature T are the variables. Using this equation, the recommended tire pressure for a measured outside air temperature is:

$$P_{Re} = P_{Pl} \cdot \left(\frac{T_{Outside}}{T_{Pl}}\right). \quad \text{Equation 2}$$

Where:
P$_{Re}$=Recommended tire pressure (psi)
P$_{Pl}$=Cold placard tire pressure (psi)
T$_{Outside}$=Outside air temperature (K)
T$_{Pl}$=Cold placard temperature (K)

EXAMPLE 2

Using the Ideal Gas Law Equation 2 in which pressure is measured in pounds per square inch (psi) and temperature is in degrees Kelvin (K). For this example, the same conditions for example 1 are used as input:
Cold placard air temperature (T$_{Pl}$)=273° K;
Placard pressure (P$_{Pl}$)=30 psi; and
Outside air temperature (T$_{Outside}$)=300° K.
Using equation 2, the recommended tire pressure (P$_{Re}$) is $$P_{Re} = 30 \text{ psi} + \left[\frac{300° \text{ K.}}{273° \text{ K.}}\right] = 32.97 \text{ psi.}$$

As can be seen, the two equations yield similar results based on the same input. The Industry Rule-Of-Thumb Equation 1 gave a recommended tire pressure of 34.86 psi, while the Ideal Gas Law equation 2 gave a recommended tire pressure 32.97 psi.

Enhanced Embodiment 1—In this embodiment, current temperature data from inside the tire itself is measured with the tire sensor 15 and utilized in determining the recommended tire pressure. The current tire temperature is used to replace the outside air temperature used in equations 1 and 2. For this embodiment, equations 1 and 2 are modified as follows:

$$P_{Re} = P_{Pl} + \left[\frac{T_{Tire} - T_{Pl}}{5.56° \text{ C./psi}}\right] \quad \text{Equation 3 (derived from equation 1)}$$

Where:
P$_{Re}$=Recommended tire pressure (psi)
P$_{Pl}$=Cold placard tire pressure (psi)
T$_{Tire}$=Current tire temperature (C)
T$_{Pl}$=Cold placard air temperature (C) and $$P_{Re} = P_{Pl} \cdot \left(\frac{T_{Tire}}{T_{Pl}}\right) \quad \text{Equation 4 (derived from equation 2)}$$

Where:
P$_{Re}$=Recommended tire pressure (psi)
P$_{Pl}$=Cold placard tire pressure (psi)
T$_{Tire}$=Current tire temperature (K)
T$_{Pl}$=Cold placard temperature (K)

Enhanced Embodiment 2—In this embodiment, the current tire temperature and the outside air temperature are used as input in determining the recommended tire pressure. Equations 1 and 2 are modified as follows:

$$P_{Re} = P_{Pl} + \left[\frac{T_{Tire} - T_{OutAir}}{5.56° \text{ C./psi}}\right] \quad \text{Equation 5 (derived from equation 1)}$$

Where:
P$_{Re}$=Recommended tire pressure (psi)
P$_{Pl}$=Cold placard tire pressure (psi)
T$_{Tire}$=Current Tire Temperature (C)
T$_{OutAir}$=Outside Air Temperature (C) and $$P_{Re} = P_{Pl} \cdot \left(\frac{T_{Tire}}{T_{Outside}}\right) \quad \text{Equation 6 (derived from equation 2)}$$

Where:
P$_{Re}$=Recommended tire pressure (psi)
P$_{Pl}$=Cold placard tire pressure (psi)
T$_{Tire}$=Current Tire temperature (K)
T$_{Outside}$=Outside Air Temperature (K)

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for recommending proper tire pressure using a tire pressure recommendation system having a processor, comprising:
    obtaining a cold placard tire pressure (P$_{Pl}$) for a cold placard air temperature (T$_{Pl}$);
    obtaining a measured outside air temperature (T$_{Outside}$);
    entering the cold placard tire pressure (P$_{Pl}$), the cold placard air temperature (T$_{Pl}$) and the measured outside air temperature (T$_{Outside}$) into the tire pressure recommendation system; and
    calculating a recommended tire pressure (P$_{Re}$) with the processor for the measured outside air temperature (T$_{Outside}$), the recommended tire pressure (P$_{Re}$) being based upon the cold placard tire pressure (P$_{Pl}$); wherein the recommended tire pressure (P$_{Re}$) is:

$$P_{Re} = P_{Pl} + \left[\frac{T_{Outside} - T_{Pl}}{5.56° \text{ C./psi}}\right].$$

2. The method of claim 1, farther comprising communicating the recommended tire pressure (P$_{Re}$) on a display.

3. The method of claim 1, further comprising:
    detecting when the tire has reached the recommended tire pressure (P$_{Re}$); and
    generating feedback indicating when the tire has been filled to the recommended tire pressure (P$_{Re}$).

4. The method of claim 3, wherein the feedback is done with a feedback element coupled to the tire pressure recommendation system.

5. The method of claim 1, wherein obtaining a measured outside air temperature (T$_{Outside}$) is done automatically by a thermometer coupled to the tire pressure recommendation system.

6. A method for recommending proper tire pressure using a tire pressure recommendation system having a processor, comprising:

obtaining a cold placard tire pressure ($P_{Pl}$) for a cold placard air temperature ($T_{Pl}$);
obtaining a measured outside air temperature ($T_{Outside}$);
entering the cold placard tire pressure ($P_{Pl}$), the cold placard air temperature and ($T_{Pl}$) and the measured outside air temperature ($T_{Outside}$) into the tire pressure recommendation system; and
calculating a recommended tire pressure ($P_{Re}$) with the processor for the measured outside air temperature ($T_{Outside}$), the recommended tire pressure ($P_{Re}$) being based upon the cold placard tire pressure ($P_{Pl}$), wherein the recommended tire pressure ($P_{Re}$) is:

$$P_{Re} = P_{Pl} \cdot \left(\frac{T_{Outside}}{T_{Pl}}\right).$$

7. A method for recommending proper tire pressure using a tire pressure recommendation system having a processor, comprising:
obtaining a cold placard tire pressure ($P_{Pl}$) for a cold placard air temperature ($T_{Pl}$);
obtaining a measured current tire temperature ($T_{Tire}$);
entering the cold placard tire pressure ($P_{Pl}$), the cold placard air temperature ($T_{Pl}$) and the measured current tire temperature ($T_{Tire}$) into the tire pressure recommendation system; and
calculating a recommended tire pressure ($P_{Re}$) with the processor for the current tire temperature ($T_{Tire}$), the recommended tire pressure ($P_{Re}$) being based upon the cold placard tire pressure ($P_{Pl}$); wherein the recommended tire pressure ($P_{Re}$):

$$P_{Re} = P_{Pl} + \left[\frac{T_{Tire} - T_{Pl}}{5.56° \text{ C.}/\text{psi}}\right].$$

8. The method of claim 7, farther comprising communicating the recommended tire pressure ($P_{Re}$) on a display.

9. The method of claim 7, further comprising:
detecting when the tire has reached the recommended tire pressure ($P_{Re}$); and
generating feedback indicating when the tire has been filled to the recommended tire pressure ($P_{Re}$).

10. The method of claim 9, wherein the feedback is done with a feedback element coupled to the tire pressure recommendation system.

11. The method of claim 7, wherein obtaining a measured current tire temperature ($T_{Tire}$) is done automatically by a tire sensor coupled to the tire pressure recommendation system.

12. A method for recommending proper tire pressure using a tire pressure recommendation system having a processor, comprising:
obtaining a cold placard tire pressure ($P_{Pl}$) for a cold placard air temperature ($T_{Pl}$);
obtaining a measured current tire temperature ($T_{Tire}$);
entering the cold placard tire pressure ($P_{Pl}$), the cold placard air temperature ($T_{Pl}$) and the measured current tire temperature ($T_{Tire}$) into the tire pressure recommendation system; and
calculating a recommended tire pressure ($P_{Re}$) with the processor for the current tire temperature ($T_{Tire}$), the recommended tire pressure ($P_{Re}$) being based upon the cold placard tire pressure ($P_{Pl}$), wherein the recommended tire pressure ($P_{Re}$) is:

$$P_{Re} = P_{Pl} \cdot \left(\frac{T_{Tire}}{T_{Pl}}\right).$$

13. A tire pressure recommendation system, comprising:
a memory element for storing data indicative of a cold placard tire pressure for a cold placard air temperature;
a thermometer capable of measuring outside air temperature near a tire;
a tire sensor positioned inside the tire, the tire sensor being capable of measuring tire temperature inside the tire;
processing logic configured to generate a recommended tire pressure for the measured outside air temperature, the recommended tire pressure being based upon the cold placard tire pressure, the outside air temperature, and the tire temperature inside the tire; and
a display for communicating the recommended tire pressure.

14. The system of claim 13, further comprising a feedback element coupled to the processing logic and configured to indicate when the tire has been filled to the recommended tire pressure.

15. A method for recommending proper tire pressure using a tire pressure recommendation system having a processor, comprising:
obtaining a cold placard tire pressure ($P_{Pl}$) for a cold placard air temperature ($T_{Pl}$);
obtaining a measured current tire temperature ($T_{Tire}$);
obtaining a measured outside air temperature ($T_{Outside}$);
entering the cold placard tire pressure ($P_{Pl}$), the cold placard air temperature ($T_{Pl}$), the measured outside air temperature ($T_{Outside}$), and the measured current tire temperature ($T_{Tire}$) into the tire pressure recommendation system; and
calculating a recommended tire pressure ($P_{Re}$) with the processor for the current tire temperature ($T_{Tire}$), the recommended tire pressure ($P_{Re}$) being based upon the cold placard tire pressure ($P_{Pl}$); wherein the recommended tire pressure ($P_{Re}$) is:

$$P_{Re} = P_{Pl} + \left[\frac{T_{Tire} - T_{Outside}}{5.56° \text{ C.}/\text{psi}}\right].$$

16. A method for recommending proper tire pressure using a tire pressure recommendation system having a processor, comprising:
obtaining a cold placard tire pressure ($P_{Pl}$) for a cold placard air temperature ($T_{Pl}$);
obtaining a measured current tire temperature ($T_{Tire}$);
obtaining a measured outside air temperature ($T_{Outside}$);
entering the cold placard tire pressure ($P_{Pl}$), the cold placard air temperature ($T_{Pl}$), the measured outside air temperature ($T_{Outside}$), and the measured current tire temperature ($T_{Tire}$) into the tire pressure recommendation system; and
calculating a recommended tire pressure ($P_{Re}$) with the processor for the current tire temperature ($T_{Tire}$), the recommended tire pressure ($P_{Re}$) being based upon the cold placard tire pressure ($P_{Pl}$); wherein the recommended tire pressure ($P_{Re}$) is:

$$P_{Re} = P_{Pl} \cdot \left(\frac{T_{Tire}}{T_{Outside}}\right).$$

* * * * *